(12) United States Patent
Boussier

(10) Patent No.: US 7,355,148 B2
(45) Date of Patent: Apr. 8, 2008

(54) TEMPERATURE EXCHANGING ELEMENT MADE BY EXTRUSION, AND ITS APPLICATIONS

(75) Inventor: Jean-Jacques Boussier, Povoa de Lanhoso (PT)

(73) Assignee: Calorigen USA Corp., Miami, FL (US)

( * ) Notice: Subject to any disclaimer, the term of this patent is extended or adjusted under 35 U.S.C. 154(b) by 0 days.

(21) Appl. No.: 11/347,300

(22) Filed: Feb. 6, 2006

(65) Prior Publication Data

US 2007/0023391 A1 Feb. 1, 2007

(30) Foreign Application Priority Data

Jul. 29, 2005 (FR) .................................. 05 08163
Jan. 4, 2006 (EP) .................................. 06290008

(51) Int. Cl.
*H05B 3/50* (2006.01)
(52) U.S. Cl. ........................ 219/544; 219/522; 165/185
(58) Field of Classification Search ..................... None
See application file for complete search history.

(56) References Cited

U.S. PATENT DOCUMENTS 2,944,138 A * 7/1960 Goff ........................... 392/353
3,312,277 A * 4/1967 Chitouras et al. ............ 165/185
4,352,008 A * 9/1982 Hofer et al. ................. 219/540
4,558,209 A * 12/1985 Hess ........................... 219/530
4,637,111 A * 1/1987 Pasternak et al. ........ 29/890.05
4,669,535 A * 6/1987 Seidler ........................ 165/78
4,822,980 A * 4/1989 Carbone et al. ............. 392/453
5,343,362 A * 8/1994 Solberg ....................... 361/710
5,653,280 A * 8/1997 Porter ........................ 165/80.3
5,991,151 A * 11/1999 Capriz ........................ 361/704
6,068,051 A * 5/2000 Wendt ......................... 165/185
2004/0238162 A1* 12/2004 Seiler et al. ................. 165/148

FOREIGN PATENT DOCUMENTS

ES 2 182 617 3/2003

* cited by examiner

*Primary Examiner*—Thor Campbell
(74) *Attorney, Agent, or Firm*—Oliff & Berridge, PLC

(57) ABSTRACT

The invention relates to a temperature exchanging element made by extrusion and able to receive a heating element and/or heat conducting element, and radiation fins. It is constituted of a single-piece base incorporating an external face equipped with means to receive the radiation fins, and an inner face equipped with at least one means to integrate the heating and/or heat conducting element, said reception and integration means being made during the extrusion of the base. Application to the manufacture of a radiation module, a dryer, an air conditioner, a solar energy collection device.

22 Claims, 7 Drawing Sheets

TEMPERATURE EXCHANGING ELEMENT MADE BY EXTRUSION, AND ITS APPLICATIONS

BACKGROUND OF THE INVENTION

1. Field of the Invention

The technical sector of the present invention is that of thermal exchange and radiation energy collection devices, and more particularly heating, cooling and solar radiation collection devices.

2. Description of the Related Art

Heating and maintaining a constant temperature in a room or building is a principal concern for architects and heating engineers who must plan for and provide one or several heating sources according to the geometry of the room to be heated. Numerous means to heat a room are known: floor heating, forced-air heating, convector heating, and radiant heating or a combination of convection and radiant heating. Radiators are currently the most common heating means. They are classically produced by molding in cast iron, steel or aluminum. The heating elements in a radiator are generally made by the circulation of hot air through piping or by electrical resistance.

New extrusion techniques used on materials, and principally on aluminum, also enable radiators to be made at a lesser cost than for molded radiators. Moreover, extrusion allows certain dimensions of the radiator to be adapted as a function of the characteristics of the room to be heated.

Thus, patent ES-2182617 describes a radiator made of extruded aluminum. This radiator is made of a central body, an upper duct and a lower duct. The upper duct and the central body are in the form of tubes with heat diffusing fins. Linking means ensure the assembly of the central body and the ducts as well as the communication between the tubes and the different parts of the radiator. The central body ensures the diffusion of heat by the circulation of hot water in its tubular part. Such an arrangement advantageously enables the length of the central body and/or ducts to be adapted according to the characteristics of the room to be heated.

This radiator, however, suffers from several drawbacks. A first drawback lies in the fact that this radiator is exclusively designed to use the circulation of hot water as a heat source. It is not possible to envisage the use of another source of heat. Another drawback lies in the fact that the heat diffusion fins are integral with the tubular part of the central body or upper duct. It is thus impossible for their appearance, arrangement or dimensions to be modified.

Different means are also known that enable the temperature of a room to be reduced. At the moment, however, few systems exist which fulfill both heating and cooling functions for a room. These means are mainly air conditioners which create a hot or cold air flow. These air conditioning systems have several drawbacks. A first drawback lies in the cost of manufacture and installation. Another drawback lies in the fact that a flow of air often generates medical problems for the users (development of germs in the system, chills, etc.). Another drawback lies in the poor efficiency of these energy-consuming systems.

SUMMARY OF THE INVENTION

The aim of the present invention is to supply a temperature exchange element offering a large exchange area and dissipating the energy in the form of low temperature radiation and providing a technical solution to the drawbacks mentioned above.

The invention thus relates to a temperature exchanger, made by extrusion, able to receive a heating and/or cooling element and radiation fins, characterized by the fact that it is constituted by a single-piece base incorporating on its external face means to receive the radiation fins and on its inner face at least one means to integrate the heating and/or heat conducting element, said reception and integration means being made during the extrusion of the base.

According to one characteristic of the invention, the temperature exchanger element is made of extruded aluminum.

According to another characteristic of the invention, the fins have an edge with a profile matching that of the reception means and are made integral with the base through the insertion of the matching profiles in the reception means of the fins.

According to yet another characteristic of the invention, the fins have a shape that is substantially that of the arc of a circle.

According to another characteristic of the invention, the fins are arranged concavely on one part of the base and convexly on the other part of the base.

According to another characteristic of the invention, the temperature exchanger element incorporates a central element constituted by two fins of opposite curvature integral with one another.

According to another characteristic of the invention, each base incorporates hooking means at its two side ends enabling several bases to be arranged side by side and joined together.

According to another characteristic of the invention, the temperature exchanger element incorporates an electrical heating element in the form of a flexible composite material, substantially flat and able to mould itself to the inner face of the base.

According to another characteristic of the invention, the heating element is bonded to the inner face of the base and is powered by an electrical source.

According to another characteristic of the invention, the heating conducting means are formed of a cooling element composed of at least one tube in which a heat conducting fluid circulates.

The invention also relates to a process to manufacture a temperature exchanging element, wherein a first profile part is extruded so as to make the base able to receive the heating means and/or the heat conducting element, and incorporating means to receive the radiation fins in the form of guide rails, and wherein the profile part is cut to the required length, and wherein at least one second profile part is extruded so as to make the radiation fins one of whose edges has a section matching that of the guide rails in the base, and wherein the fins are cut out according to the base's dimensions and wherein the fins are inserted into the base's guide rails.

The invention also relates to a temperature control device, wherein it incorporates a temperature exchanging element, a temperature sensor and a support for the temperature-exchanging element.

The invention also relates to a radiation module, wherein it incorporates a support and a temperature-exchanging element.

The invention also relates to a radiation module, wherein it incorporates a support and a single-piece temperature exchanging element incorporating radiation fins obtained by extrusion, said temperature exchanging element incorporating means to integrate a heating and/or heat conducting element.

The integration means for a heating element are in the form of rails between which a heating element may be inserted.

The heating element is a woven resistor, a heating brick or a self-regulating resistance.

The fins have a corrugated profile so as to increase the heat exchange surface.

According to one characteristic of the invention, the radiation module incorporates a diffuser.

The invention also relates to a temperature control device for a room or a vehicle, wherein it incorporates a temperature sensor, means to control the temperature and at least one radiation module, and wherein it is in an elongated shape, relatively narrow, so as to be used as a baseboard, as a temperature exchanging profile for the ceiling or as a post for an opening or as a 360° radiation column.

The invention also relates to a temperature control device for a room or a vehicle, wherein it incorporates a temperature sensor, means to regulate the temperature and at least four radiation modules positioned vertically in a circle so as to produce a 360° radiation column.

The invention also relates to a towel, linen or other textile warmer or dryer, characterized by the fact that it incorporates temperature control means and several radiation modules according joined together and at least one fairing prolonging the diffuser.

The invention also relates to an air conditioner for a dwelling, a vehicle or an aircraft, characterized by the fact that it incorporates a temperature control device or a radiation module, a pump enabling the circulation of cooling fluid and a cooling circuit enabling the cooling fluid to cool.

The invention also relates to an air conditioner for a dwelling, vehicle or aircraft, characterized by the fact that it incorporates at least one radiation module, a pump enabling the circulation of the cooling fluid and a cooling circuit enabling the cooling fluid to cool.

Finally, the invention relates to a device to collect solar energy, wherein it incorporates a support supporting at least one temperature exchanging element, and a heat-collecting panel.

Finally, the invention relates a process to manufacture a radiation module, wherein a profiled part constituting a single-piece temperature exchanging element is extruded which incorporates radiation fins and means to integrate a heating element, and wherein the profiled part is cut to the required length so as to make a single-piece temperature exchanging element and wherein the single-piece element is made integral with a support.

A first advantage of the device according to the invention lies in its modularity. Another advantage lies in its low manufacturing cost.

Another advantage lies in the possibility of being able to produce a device of specific dimensions, shape and appearance at low cost.

Another advantage lies in the simplicity and rapidity with which the device is assembled. Another advantage lies in the high efficiency of the temperature exchanging element and the devices implementing it.

Another advantage lies in the fact that the radiation area of the heating device can be modified by replacing one or several fins.

Another advantage lies in the fact that the temperature-exchanging element has a large exchange area.

Another advantage of a specific embodiment of the invention lies in the fact that the temperature-exchanging element made of extruded aluminum provides very good heat conductivity.

Another advantage lies in the fact that the invention enables the diffusion of heat to be eliminated by the stratification of hot air at ceiling height thereby reducing energy consumption.

BRIEF DESCRIPTION OF THE DRAWINGS

Other characteristics, particulars and advantages of the invention will become more apparent from the following description given by way of illustration with reference to the appended drawings, in which.

DETAILED DESCRIPTION OF PREFERRED EMBODIMENTS

The operating principle implemented in the temperature exchanging element according to the invention is that of the use of a reduced ΔT (temperature difference) between the temperature production source and the source of use, thereby inducing a substantial improvement in efficiency, and consequently a substantial reduction in energy consumption. The temperature-exchanging element may be used in radiator mode to warm a room or in evaporator mode to reduce the temperature in a room.

Figure 1:
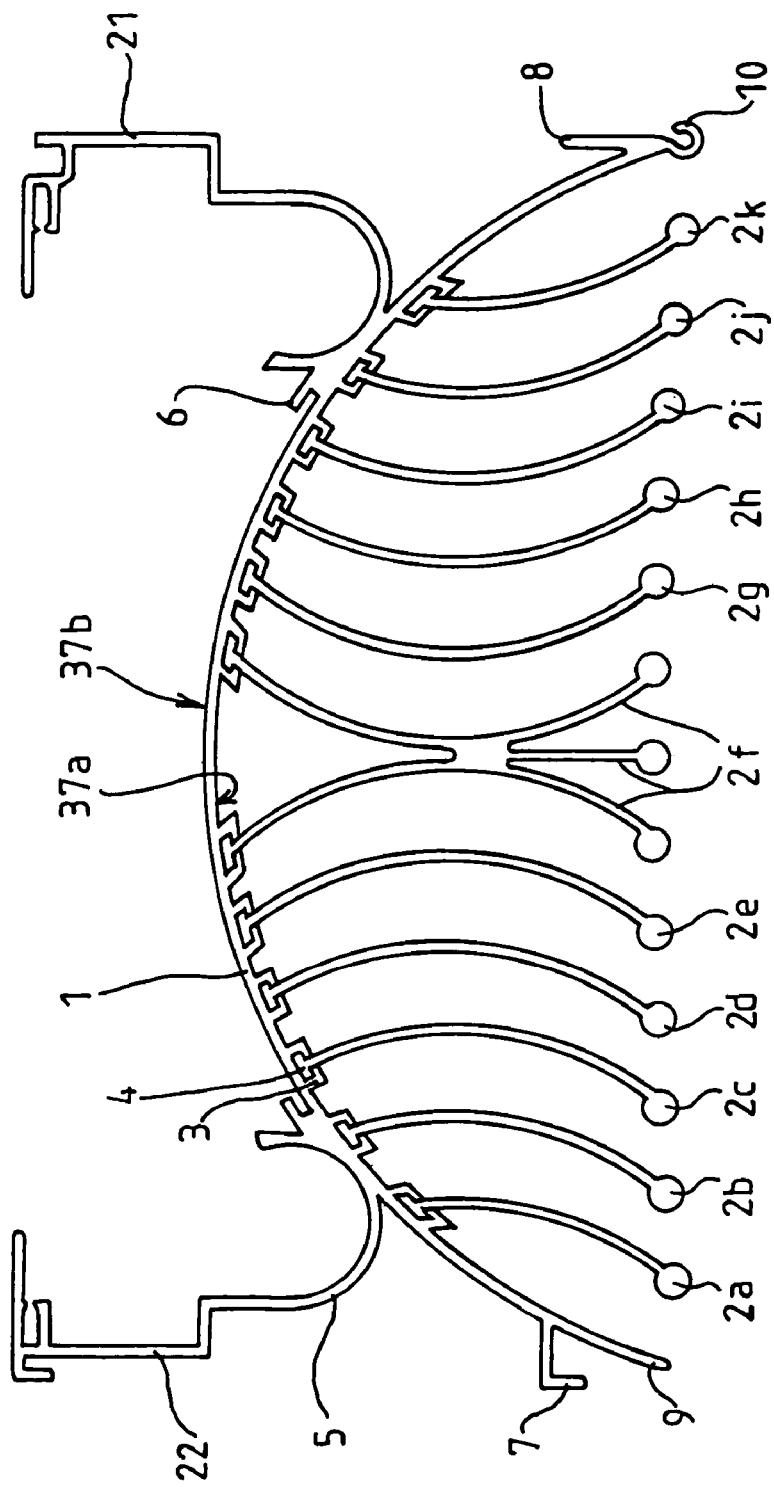
FIG. 1 represents a top view of one embodiment of a temperature-exchanging element according to the invention.

FIG. 1 shows a top view of a temperature-exchanging element 20 according to the invention. In this embodiment, the temperature-exchanging element 20 incorporates a single-piece extruded base 1 onto which heat-exchanging fins 2a to 2k made by extrusion are attached. The single-piece base 1 has an external face 37a provided with guide rails 3 constituting reception means for the radiation fins and an inner face 37b provided with means 6 to integrate a heating element and means 5 to integrate a heat conducting element. The guide rails 3 and the integration means 5, 6 are joined to the base 1 and are made when the base is being extruded. The heat conducting element integration means 5 have a substantially semi-circular profile able to receive a substantially tubular heating element. The heating element integration means are here formed of tongues 6 able to hold a flexible and substantially flat heating element (for example a heating fabric) in place.

Each fin 2a to 2k is separate from the others and on one edge has a profile 4 matching that of the guide rails 3 so as to be made integral with the base 1 by sliding its edge 4 into the guide rail 3 of the base 1. Fins 2a to 2k have a profile that is substantially in the shape of the arc of a circle. In this embodiment, fins 2a to 2e are shown arranged concavely on one part of the base 1 and 2g to 2k are arranged convexly on another part of the base 1. A central element 2f is formed of two fins of opposing curvature joined together at one part of their contact surface.

The base 1 is provided on one side (to the left of the Figure) with a protrusion 9 and a hook 7 and on the other side (to the right of the Figure) with a hook 10 and a tongue 8. These elements allow several temperature-exchanging elements to be joined together, or joined to a support not shown here. The base 1 is also provided with two lugs 21 and 22 enabling it to be fastened in the support.

The exchanger as described enables a low ΔT between the temperature source of production and source of use, which is not the case of known devices.

Figure 2:
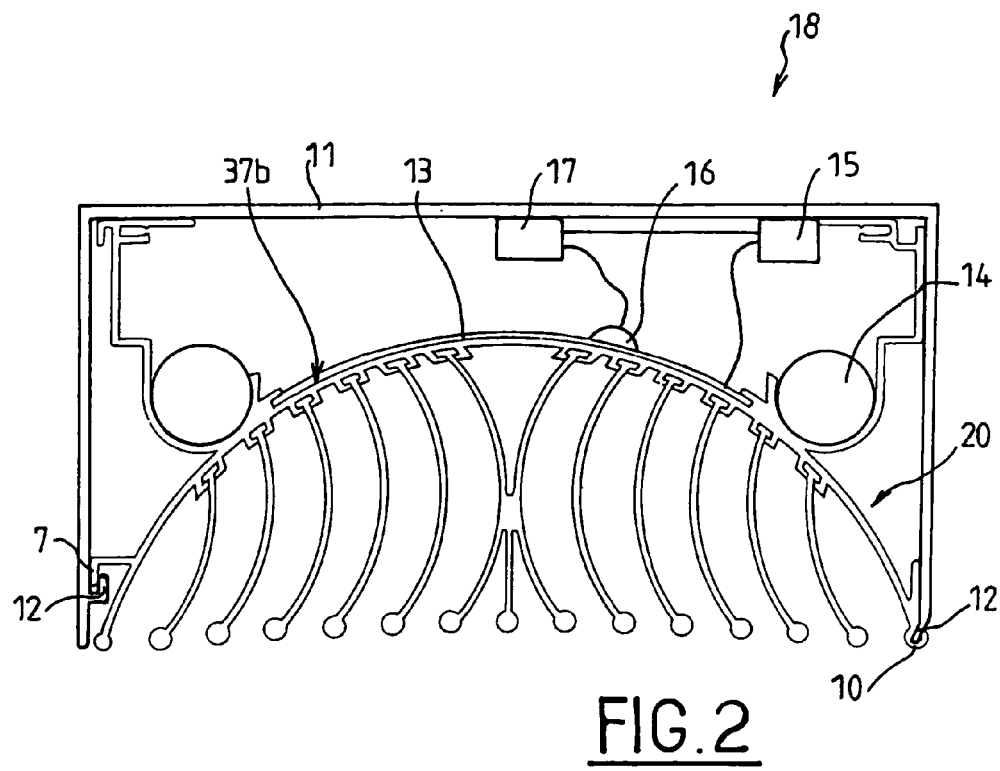
FIG. 2 shows an embodiment of a temperature control device according to the invention.

FIG. 2 shows an embodiment of a temperature control device 18 according to the invention. The temperature control device 18 incorporates a temperature exchanging element 20 such as that described previously with reference to FIG. 1, and electrical heating element 13, a heat conducting element 14, a temperature sensor 16, a computer 17 and a support 11 for the temperature exchanging element.

The support 11 incorporates hooking means 12 cooperating with hooking means 7 and 10 of the temperature exchanging element 20. Lugs 21 and 22 of the base press on the bottom of the side panel of the support 11.

The heating element 13 is in the form of a flexible composite material, substantially flat which moulds itself to the inner face 37b of the base 1 of the temperature-exchanging element 20. The heating element is for example a heating fabric powered by an electrical source 15 and bonded to the inner face 37b of the base 1. The temperature sensor 16 is directly fastened to the heating element 13 or to the base 1 so as to constantly monitor the temperature diffused. The temperature sensor 16 and the electrical source 15 are connected to the computer 17 which regulates the energy supplied to the heating fabric according to the difference between the temperature measured and the temperature required. The heating conducting means 14 are formed of a cooling element composed of two tubes 14 in which a cooling fluid circulates.

Such an arrangement advantageously enables a temperature control device to be obtained that can both act as a radiator by implementing the heating element 13 and an air conditioner by implementing the cooling element 14.

Advantageously, the use of a low power flexible composite material bonded to the rear part of the temperature exchanging element enables the temperature of the heat producing source to be maintained at a much reduced level, thanks to the large exchange area provided by the fins. Thus, the invention allows a room to be heated by the dissipation of radiant heat at a ΔT of around 8° C. The reduction of the ΔT increases efficiency and reduces energy consumption.

Figure 3:
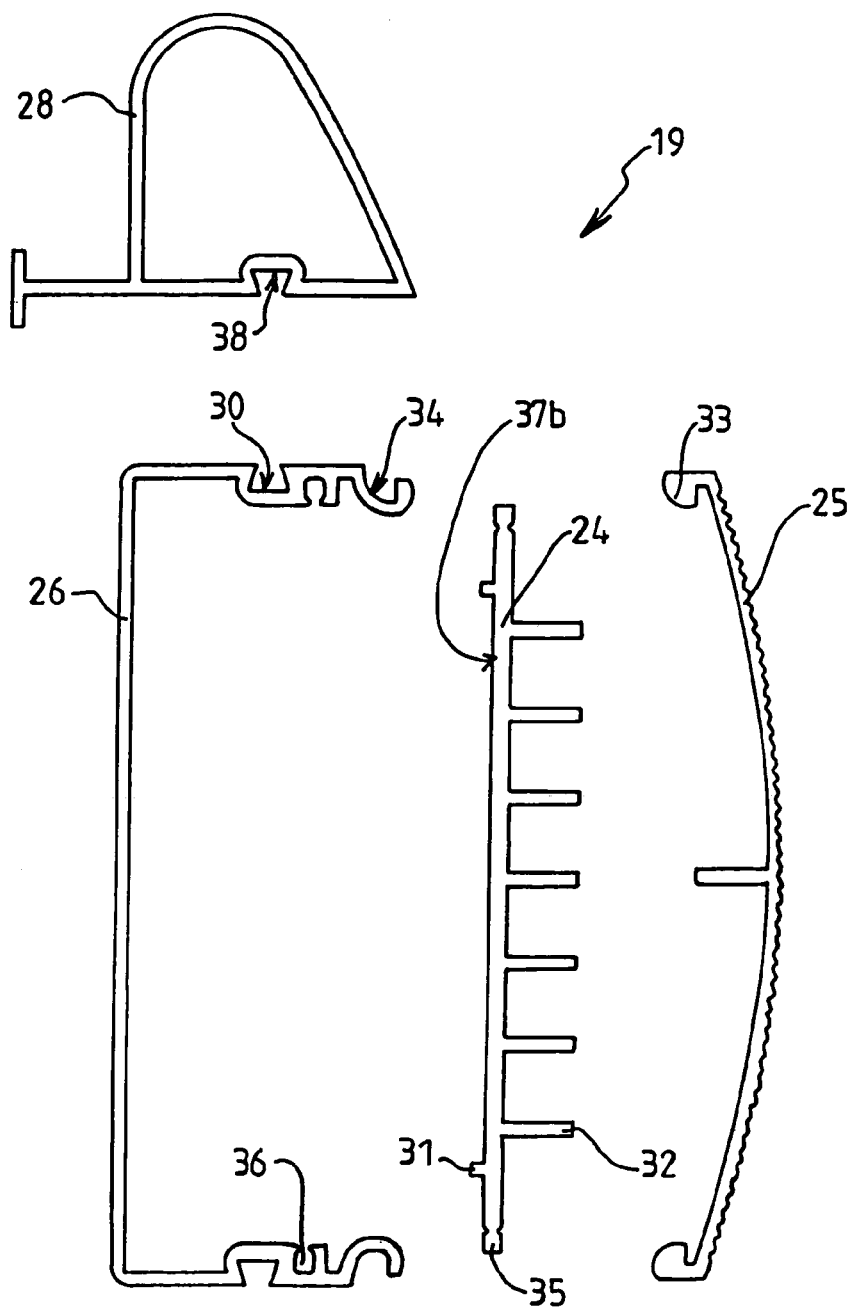
FIG. 3 shows an exploded view of one embodiment of a radiation module.
Figure 3:
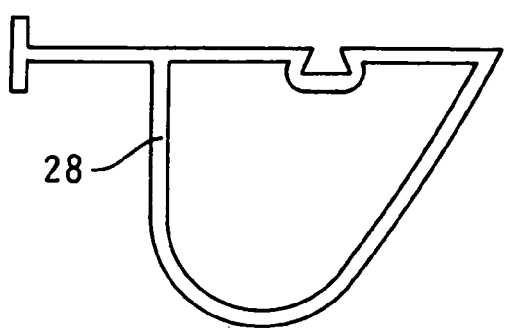

FIG. 3 shows an exploded view of one embodiment of a radiation module. In this embodiment, the radiation module 19 incorporates a support 26, a diffuser 25 and a temperature-exchanging element 24 arranged between the support 26 and the diffuser 25. Fairings 28 are provided to be fastened on either side of the radiation module 19. The support 26 is provided with grooves 36 with a profile matching that of the ends 35 of the temperature exchanging element 24 so that this may be made integral with the support 26 by sliding its ends 35 into grooves 36. The diffuser 25 incorporates pins 33 at its ends. The support 26 also incorporates channels 34, of a profile matching that of the pins 33 of the diffuser 25 so that the diffuser may be made integral with the support by sliding its pins 33 into the channels 34. Lastly, the support 26 and fairings 28 respectively incorporate dovetailed profiles 30 and 38 allowing them to be joined together.

The temperature exchanging element 24 incorporates rails 31 on its inner face 37b (face opposite that supporting the fins) between which a heating element may be positioned.

The temperature exchanging element 24 is shown to form a single piece incorporating straight fins 32, but a temperature exchanging element such as that described with reference to FIG. 1 may equally be implemented without departing from the scope of the invention. Similarly, the radiation module may be equipped with a heat-conducting element such as that described previously with reference to FIG. 2.

The module thus produced may have different dimensions. In a specific embodiment, the radiation module is of an elongated shape with a reduced width so as to be used as a base board, a post for an opening or ceiling profile. By "reduced in width" we mean a distance between the diffuser 25 and the bottom of the support 26 of around a few centimeters. In another embodiment, the radiation module will be of a width from a few centimeters to several decimeters and will be of a length of between 10 centimeters and several meters.

Figure 4:
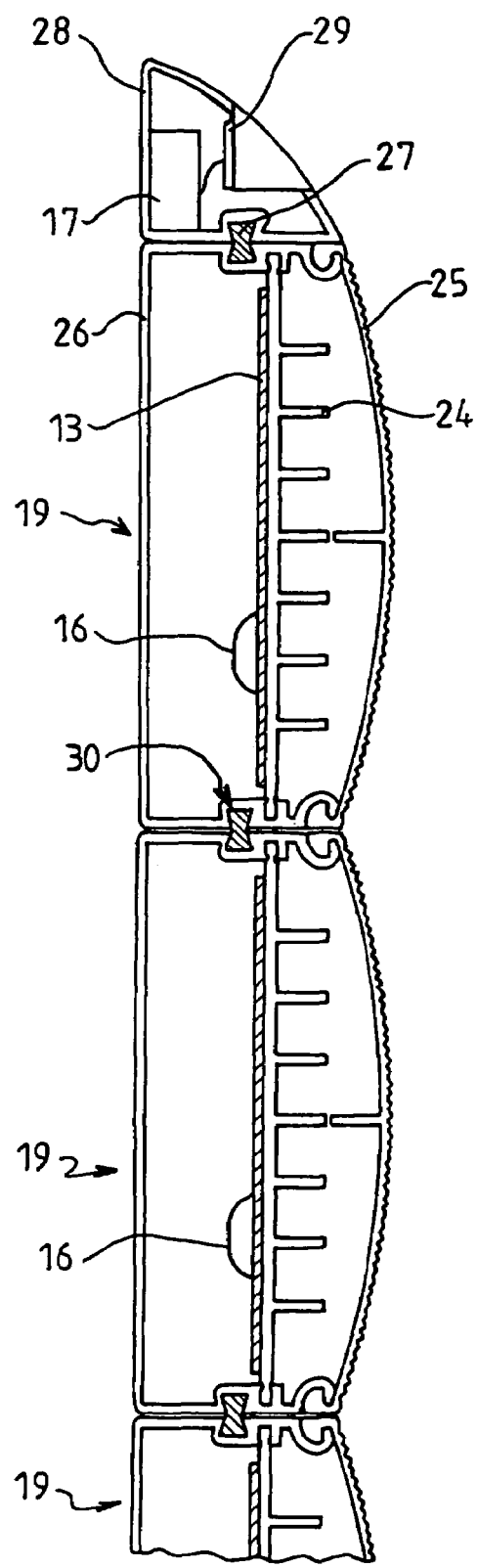
FIG. 4 shows one embodiment of a dryer, FIG. 5 schematically illustrates one embodiment of an air conditioner integrated into a dwelling.

FIG. 4 shows an embodiment of a towel, linen or textile warmer/dryer incorporating a temperature exchanger according to the invention. The towel dryer is made using several radiation modules 19 joined to one another and a fairing 28 (of which only two modules are shown). In this embodiment, the radiation modules 19 and fairing 28 are joined by means of double dovetailed profile parts 27 cooperating with matching profiles on the support 26 of modules 19 and fairing 28. The fairing 28 is in such a shape as to prolong the diffuser 25.

Each radiation module 19 incorporates an electric heating element 13 in the form of a flexible composite material, substantially flat and molding itself to the inner face 37b of the temperature exchanging element 24, and a temperature sensor 16. A computer 17 is electrically connected to the different temperature sensors 16, to the electrical power supply of the heating elements 13 and to a user interface 29. The user interface enables the user to determine the operational parameters of the dryer and to visualize the operational data such as the dryer temperature or drying power. The computer acts as a temperature control means by regulating the electrical power diffused by the heating element according to the ΔT measure between the value recorded and the temperature measured. In this embodiment, the computer 17 and the user interface 29 are advantageously arranged in the fairing 28. The invention may obviously be produced by arranging these elements outside of the dryer, for example on a wall or home automation control panel.

Figure 5:
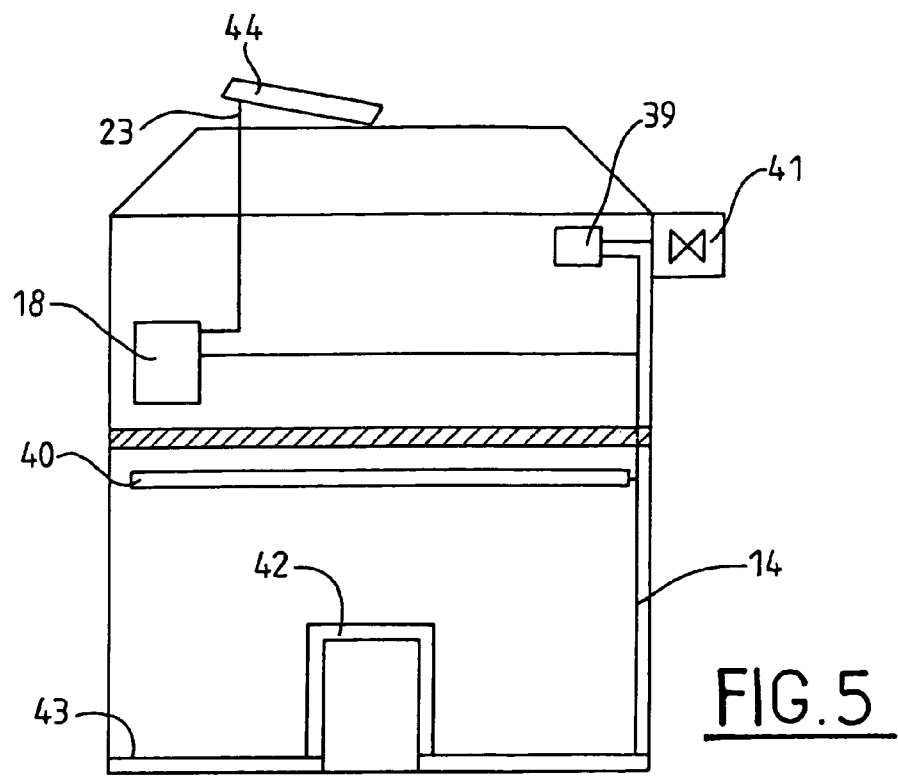

FIG. 5 schematically shows an example of use in a dwelling of different embodiments of a temperature exchanger according to the invention. Temperature exchangers according to the invention are here in relation with a cooling circuit. In this example, the dwelling is equipped with a temperature control device 18 such as described previously with reference to FIG. 2, and with radiation modules 40, 42 and 43 such as described previously in reference to FIG. 3. In this example, the temperature control device 18 and radiation modules 40, 42 and 43 incorporate a heat conducting means made by a water circulation duct 14. The water here acts as a cooling fluid. The water circulation duct 14 is connected to a pump 39 and to a condenser 41. The pump 39 enables water to circulate through the duct 14 and the condenser 41, arranged outside the dwelling, enables the water to be cooled by thermal exchange with the outside air. The pump 39, the condenser 41 and the water circulation duct as well as a cooling circuit enable the cooling fluid to be cooled.

The radiation modules 40, 42 and 43 implemented in this example are baseboards 40 and 43 and posts 42 for openings (the opening in this case being a door).

A solar energy collection device 44 (whose operation will be described later) has also been installed so as to supply the temperature control device 18 with hot water by means of the duct 23.

The temperature exchangers implemented in this example of use are given by way of illustration and are non exhaustive. A volume or dwelling may be similarly equipped with the different elements according to the invention. These elements may be installed so as to be complementary in their operation.

In a variant integration (not shown), an air conditioner according to the invention may be integrated into a vehicle such as an aircraft. During flight at high altitudes, the external temperature is low enough to enable a thermal exchange assisting the air conditioning of the aircraft by arranging a temperature exchange profile part in a recess adapted to the structure of the aircraft. The duct 14 in which a heat conducting fluid circulates associated with this device acts as a cooling circuit. The fluid thus cooled in then directed (for example by a pump) towards a temperature exchanger operating in evaporator mode, to capture the heat of the cabin.

Figure 6:
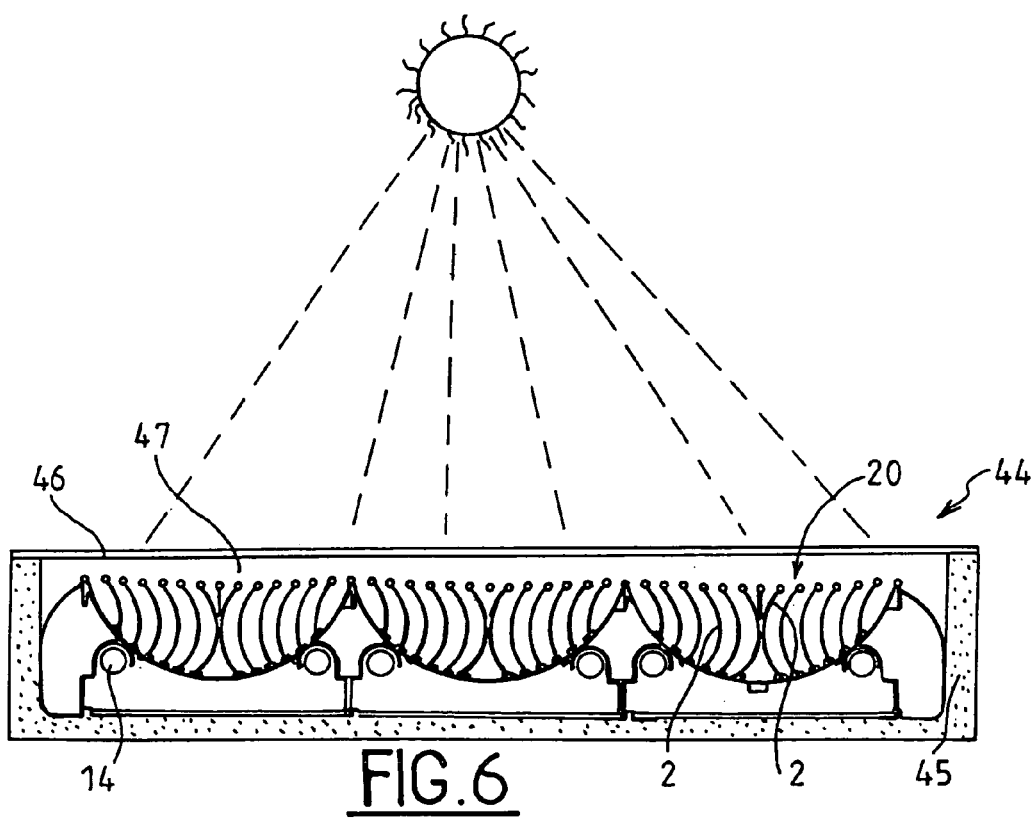
FIG. 6 shows one embodiment of a solar energy collection device.

FIG. 6 shows an embodiment of a solar energy collection device incorporating temperature exchanger elements 20 according to the invention.

In this embodiment, the solar energy collection device 44 incorporates a support 45, temperature-exchanging elements 20 according to the invention, a heat collection panel 46 and heat conducting means are present in the form of one or several tubes 14 in which a heat conducting fluid circulates. The support 45 and heat collection panel 46 constitute an enclosure 47 in which one or several temperature exchanging elements are arranged. To improve efficiency, black mat anodized temperature exchangers 20 will preferably be used.

This device operates as follows: the infrared radiation heats the fins of the temperature exchanger element 20, the heat from the fins is propagated throughout the exchanger until it reaches the heat conducting means and heats the water circulating in the tubes 14. A pump (not shown) ensures the circulation of the water. Advantageously, the use of curves fins improves the efficiency of the device. Indeed, even though the infrared radiation is largely absorbed by the fins, there always remains a certain reflection of the radiation. The curvature of the fins enables the reflected radiation to be directed to the base 1 of the temperature exchanger element so that they may finally be absorbed either by the base or by an adjacent fin.

Figure 7:
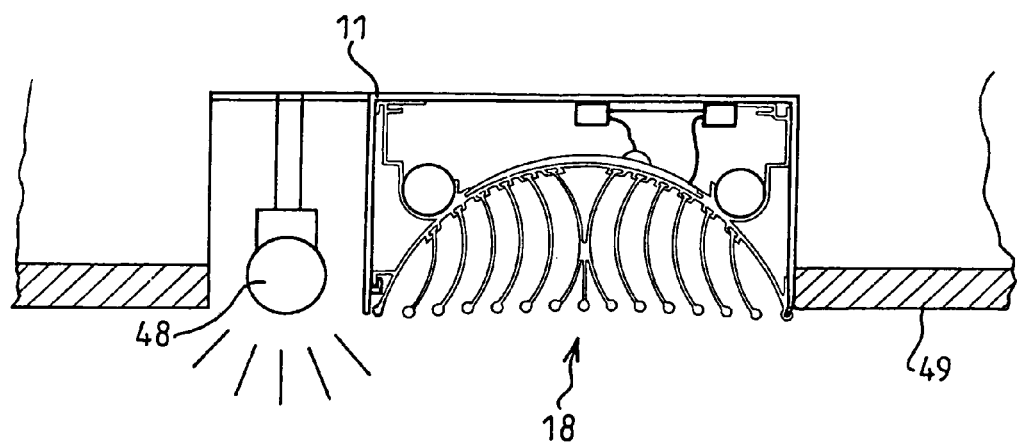
FIG. 7 shows another application of the invention.

FIG. 7 shows another application of the invention. In this specific mode of use, a temperature control device 18 has been made such as that described previously in reference to FIG. 2 and able to be mounted in a false ceiling 49 thereby constituting a temperature exchange profile part for ceilings. This device is thus of a length corresponding to the standard length of a neon light (classically from 600 mm to 1,800 mm), a height of around 100 mm to 300 mm and a width of around 100 mm to 500 mm. The temperature control device may thus be arranged in the false ceiling 49, for example next to the lighting 48. In this specific embodiment, the support 11 will incorporate reception means able to receive the lighting element 48.

Figure 8:
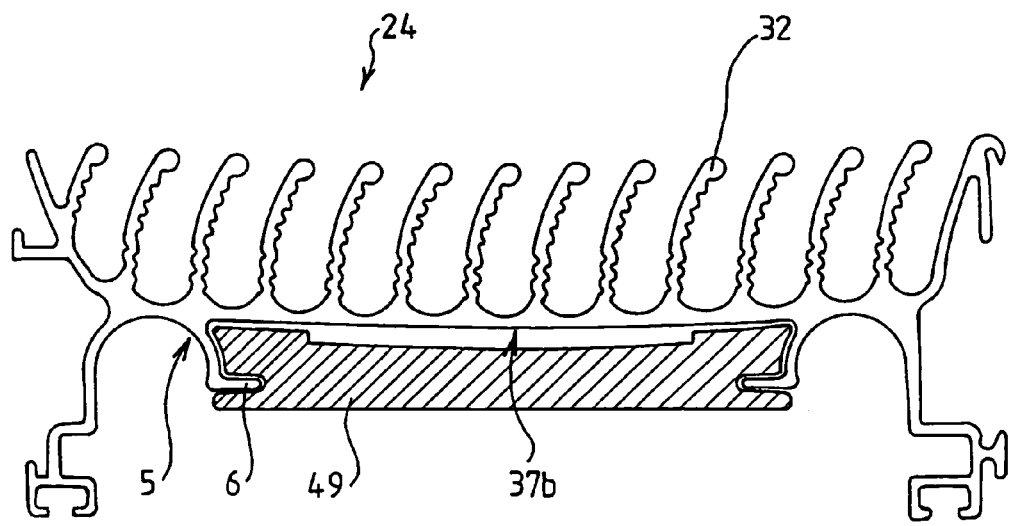
FIG. 8 shows an embodiment of the temperature-exchanging element.

FIG. 8 illustrates a variant embodiment of a temperature-exchanging device.

In this embodiment, the temperature-exchanging device 24 is single-piece and incorporates radiation fins 32 on its outer face. The temperature-exchanging device 24 also incorporates, on its inner face 37b (face opposite that carrying the fins), integration means 6 for a heating element and means 5 to integrate a heating conducting element. The heating element integration means 6 are in the form of rails 6 between which a heating conducting element of the woven resistor or heating brick type 49. Such a heating brick is generally made by a refractory element (for example of terra-cotta) into which an electric resistance has been inserted. However, such a brick will preferably be made in the form of a block of extruded aluminum onto which a low temperature adhesive woven resistor is laid.

Thus, contrary to refractory bricks whose electrical resistance reaches temperatures of around 600° C., a heating element of the extruded aluminum heating brick type advantageously constitutes a heating block by Joule effect at low temperature (that is to say whose operating temperature is lower than 130° C.). Such an embodiment advantageously presents a thermal inertia linked to the mass of the aluminum block leading to an accumulation of low temperature heat which is slowly dissipated by radiation and conduction through the metallic structure of the exchanger, causing a thermal smoothing effect and avoiding sudden variations in temperature.

An adhesive woven resistor type heating element acting at low temperature may also be fastened directly to the inner face 37b.

The dimensions of the woven resistor and its heating load will be calculated according to the intrinsic characteristics of the exchanger profile and according to the difference in temperature between the room to be heated and the exchanger profile.

Advantageously, the radiation fins 32 will be in the form of the arc of a circle whose corrugated profile on one face enables the exchange surface of the exchanger to be increased, the other visible face is deliberately made without corrugation so as to avoid the accumulation of dust.

Such a profile is preferentially intended to be installed in a horizontal position, for example for the production of 360° radiation column wall heaters or skirting heaters.

The exchanger thus built constitutes a hybrid exchanger enabling the operation and use of heat or cold generating powers and concepts from several sources, acting together or separately. By way of example, the collector part may be supplied by the power from a heat conducting fluid from a solar panel during the day and, in the event of a reduction in solar power automatically switch to the heating power produced by woven resistors, or that from a heat pump, with the reverse cycle also being possible.

Figure 9:
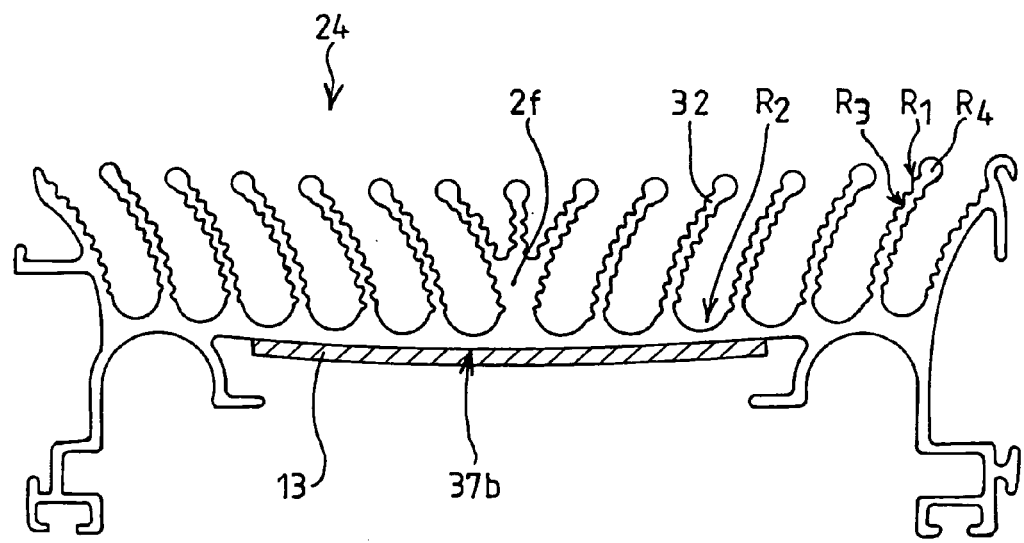
FIG. 9 shows another embodiment of the temperature exchanging element.

FIG. 9 illustrates a variant embodiment of a temperature exchanging element incorporating a central element 2f constituted by two fins of opposing curves joined at part of their contact surface. The fins, as well as the central element, have a corrugated profile so as to increase the heat-exchanging surface. An electrical heating element 13 is in the form of a flexible composite material bonded to the inner face 37b of the temperature-exchanging element.

In this embodiment, the fins 32 are corrugated on each of their faces. The corrugation of the fins 32 is made by a succession of concave curves of radius R3 and convex curves of radius R1. The ends of the fins have a circular profile of radius R4. The exchanger element also has a semi-circular profile of radius R2 between each fin.

Corrugating the fins provides an increase in exchange surface of more than 40% with respect to a profile that does not have such corrugations. Thus, depending on the effect required, the fins may have a corrugated profile on one or two faces, this profile being extended over the full length of the fin or solely on one portion of the fin, as may be seen in FIG. 8 at the base of the fins.

Figure 10:
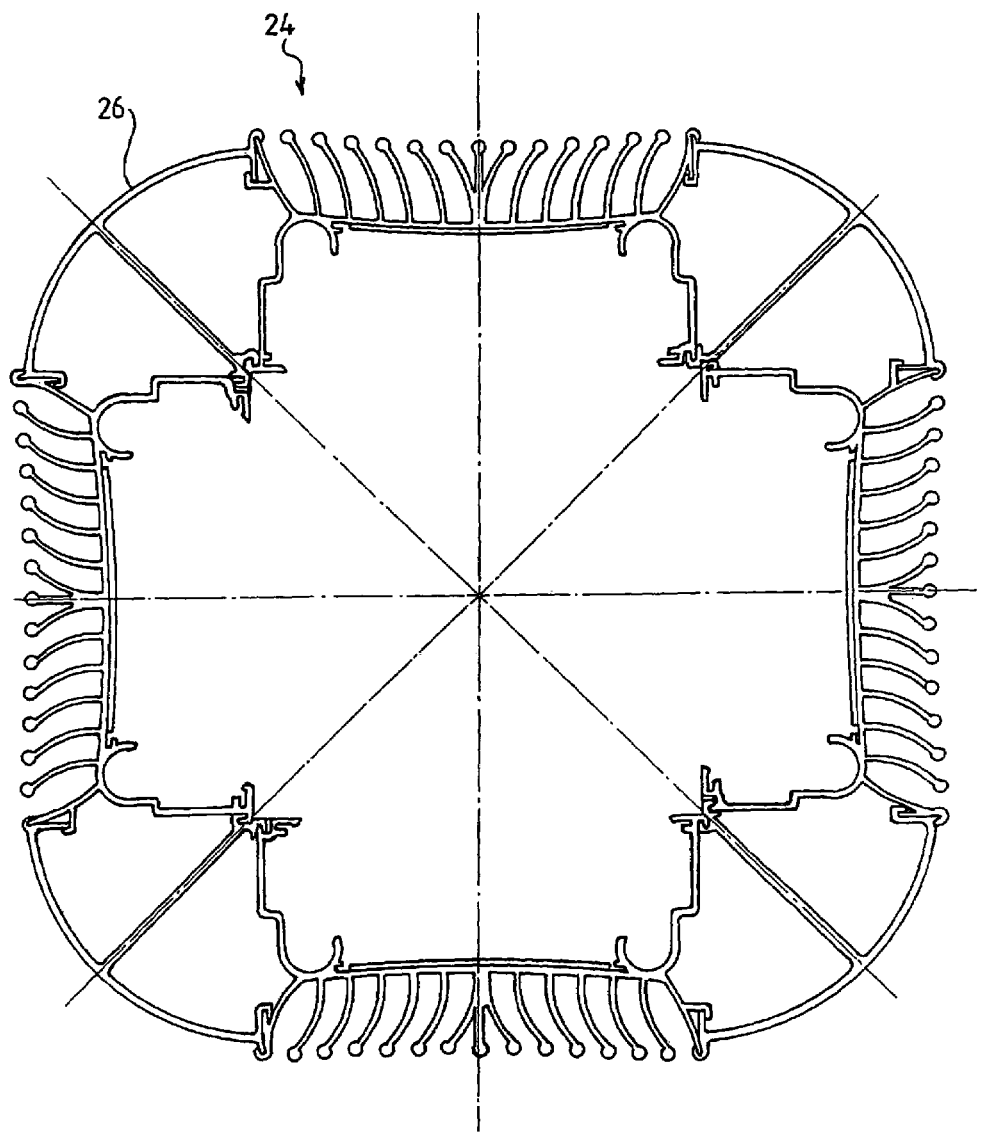
FIG. 10 shows the embodying of a temperature-exchanging element in the form of a column.

FIG. 10 illustrates an embodiment of a temperature-exchanging element in a column shape. The temperature exchanging element is formed of radiation modules incorporating a support and a temperature exchanging element, for example such as that described with reference to FIG. 9, positioned vertically and in a circle so as to produce a radiation column at 360° acting as a vertical heater with a dissipation of power over 360°. The column is made by assembling four temperature-exchanging elements 24 with four angular supports 26 substantially in the arc of a circle. A column incorporating a larger number of modules may also be produced, for example six or eight vertical modules, the angular supports being in this case respectively sixths or eighths of a circle.

This assembly principle for the exchanger elements enables substantial heating power to be positioned on a reduced surface but providing optimum exchange surface, the result obtained being a distribution of heat at low temperature, by radiation with very little convection, and an even distribution of the heat over 360°.

Generally speaking, and for all the devices and elements in the invention, the use of fins of different shapes firstly enables different aesthetic effects and secondly different technical effects to be produced. Thus, the use of curved or corrugated fins provides a greater thermal exchange surface, thus improved efficiency of the heating device. Any other form of fin may naturally be provided.

Such an arrangement may only be obtained by extrusion. Indeed, only extrusion enables such matching shapes to be made accurately. Such accuracy thus enables the base and fins to be accurately assembled and guarantees the proper thermal continuity between these parts. The elements constituting the invention will preferably be made of aluminum or one of its alloys. Indeed, aluminum has thermal properties that are particularly well adapted to the production of temperature exchanges and has mechanical properties adapted to extrusion.

Advantageously, the use of low power flexible composite heating material bonded to the rear part of the temperature exchange element enables, thanks to large exchange area of the fins, the temperature of the heat production source to be limited to a much reduced level. Thus, the invention enables a room to be heated through the dissipation of radiation energy at a ΔT of around 8° C. The reduction of the ΔT improves efficiency and reduces energy consumption.

Another advantage lies in the fact that the temperature exchanger element is made of extruded aluminum thereby enabling the use of small thickness of metal, inducing the immediate transfer of heat by conduction and eliminating any thermal inertia. This results in the almost total elimination of the infrared radiation at the rear part of the radiator.

Another advantage of the invention lies in the fact that use with a low ΔT induces negligible dilation and thus an absence of noise and stresses linked to the dilation of the different elements.

Yet another advantage lies in the fact that the temperature exchanger element enables radiation to be both vertical and horizontal by 180°, thereby evenly distributing the radiant heat.

Advantageously, this device does not require any parts to fix the different elements, nor does it require welding, allowing it to be simple and quickly assembled for a reduced cost. Moreover, such a device has the advantage of being able to be sold in kit form in order to be assembled by the user. Sale in kit form means the advantage of having a radiator of relatively low bulk, thereby reducing storage and transport costs.

Advantageously, this device constitutes a hybrid radiator enabling the use of an electrical source, a heating (or cooling) source or the simultaneous use of several power sources.

Radiation modules, or ceiling profiles may also be made according to a specific embodiment of the invention in long lengths, and able to nest into one another or be connected together.

One advantage of the use of extruded aluminum lies in the excellent thermal conduction characteristics of aluminum. These characteristics enable the use of heating element operating at low temperature. Thus, self-regulating resistances (known as PTC resistances) can be used as heating elements. Such an association enables the invention to be particularly efficient.

What is claimed is:

1. A temperature exchanging element, made by extrusion, able to receive a heating and/or heat conducting element and radiation fins, wherein said temperature exchanging element comprises a single-piece base incorporating on its external face means to receive said radiation fins and on its inner face at least one means to integrate said heating and/or heat conducting element, said reception and integration means being made during the extrusion of said base.

2. A temperature-exchanging element according to claim 1, wherein said temperature exchanging element is made of extruded aluminum.

3. A temperature exchanging element according to claim 1, wherein said fins are provided with an edge with a profile matching that of said reception means and are made integral with said base through the insertion of said matching profiles in said reception means of said fins.

4. A temperature exchanging element according to claim 3, wherein said fins have a shape that is substantially that of the arc of a circle.

5. A temperature exchanging element according to claim 4, wherein said fins are arranged concavely on one part of said base convexly on the other part of said base.

6. A temperature exchanging element according to claim 5, wherein said temperature exchanging element incorporates a central element constituted by two fins of opposite curvature integral with one another.

7. A temperature exchanging element according to claim 6, said base incorporates hooking means at its two side ends enabling several bases to be arranged side by side and joined together.

8. A temperature exchanging element according to claim 1, wherein said temperature exchanging element incorporates an electrical heating element in the form of a flexible composite material, substantially flat and able to mould itself to the inner face of said base.

9. A temperature exchanging element according to claim 8, wherein said heating element is bonded to the inner face of said base and is powered by an electrical source.

10. A temperature exchanging element according to claim 9, wherein said heating conducting means are formed of a cooling element composed of at least one tube in which a heat conducting fluid circulates.

11. A process to manufacture a temperature exchanging element according to claim 1, wherein a first profile part is extruded so as to make said base able to receive said heating means and/or said heat conducting element, and incorporating means to receive said radiation fins in the form of guide rails, and wherein said first profile part is cut to the required length, and wherein at least one second profile part is extruded so as to make said radiation fins one of whose edges has a section matching that of said guide rails in said base, and wherein said fins are cut out according to the dimensions of said base and wherein said fins are inserted into said guide rails of said base.

12. A temperature control device, wherein said device incorporates a temperature-exchanging element according to claim 1, a temperature sensor and a support for said temperature-exchanging element.

13. A radiation module, wherein said module incorporates a support and a temperature exchanging element according to claim 1.

14. A radiation module according to claims 13, wherein said fins are provided with a corrugated profile so as to increase said heat exchange surface.

15. A radiation module according to claim 13, wherein said module comprises a diffuser.

16. A temperature control device for a room or a vehicle, wherein said device incorporates a temperature sensor, means to control the temperature and at least one radiation module according to claim 13, and wherein said device is in an elongated shape, relatively narrow, so as to be used as a baseboard, as a temperature exchanging profile for the ceiling or as a post for an opening or as a 360° radiation column for.

17. A device to control the temperature of a room or vehicle, wherein said device incorporates a temperature sensor, means to regulate the temperature and at least four radiation modules according to claim 13 positioned vertically in a circle so as to produce a 360° radiation column.

18. A towel, linen or other textile warmer or dryer, wherein said warmer or dryer incorporates a temperature control means and several radiation modules according to claim 13, joined together and at least one fairing prolonging said diffuser.

19. An air conditioner for a dwelling, a vehicle or an aircraft, wherein said conditioner incorporates a temperature control device according to claim 12, a pump enabling the circulation of cooling fluid and a cooling circuit enabling the cooling fluid to cool.

20. An air conditioner for a dwelling, vehicle or aircraft, wherein said conditioner incorporates at least one radiation module according to claim 13, a pump enabling the circulation of the cooling fluid and a cooling circuit enabling the cooling fluid to cool.

21. A device to collect solar energy, wherein it incorporates a support supporting at least one temperature exchanging element according to claim 10, and a heat collecting panel.

22. An air conditioner for a dwelling, a vehicle or an aircraft, wherein said conditioner incorporates a radiation module according to claim 13, a pump enabling the circulation of cooling fluid and a cooling circuit enabling the cooling fluid to cool.

* * * * *